US008165779B2

(12) United States Patent
Ostberg et al.

(10) Patent No.: US 8,165,779 B2
(45) Date of Patent: *Apr. 24, 2012

(54) CASCADE CONTROL OF HCCI PHASING

(75) Inventors: Claes Ostberg, Lilla Edet (SE); Lucien Koopmans, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 655 days.

This patent is subject to a terminal disclaimer.

(21) Appl. No.: 12/339,421

(22) Filed: Dec. 19, 2008

(65) Prior Publication Data

US 2009/0164100 A1 Jun. 25, 2009

(30) Foreign Application Priority Data

Dec. 20, 2007 (EP) .................................... 07150217

(51) Int. Cl.
*F02B 3/00* (2006.01)
*F02B 5/00* (2006.01)
*B60T 7/12* (2006.01)
*G05D 1/00* (2006.01)
*G06F 7/00* (2006.01)
*G06F 17/00* (2006.01)

(52) U.S. Cl. ......................... 701/103; 123/299; 123/305

(58) Field of Classification Search .................. 701/103, 701/105, 113; 123/299, 90.15, 295, 305, 123/345, 346, 347, 348
See application file for complete search history.

(56) References Cited

U.S. PATENT DOCUMENTS

| 7,489,998 B2 * | 2/2009 | Bauer et al. .................... 701/103 |
| 2004/0173180 A1 | 9/2004 | Strom et al. |
| 2006/0174853 A1 * | 8/2006 | Koopmans ..................... 123/295 |
| 2007/0079798 A1 * | 4/2007 | Siewert .......................... 123/299 |
| 2008/0041334 A1 * | 2/2008 | Brehob .......................... 123/299 |
| 2008/0173277 A1 * | 7/2008 | Otterspeer et al. ............. 123/295 |
| 2008/0295798 A1 * | 12/2008 | Reitz et al. ..................... 123/299 |
| 2009/0018755 A1 * | 1/2009 | Inoue ............................. 701/103 |

FOREIGN PATENT DOCUMENTS

| DE | 102005009104 | 8/2006 |
| EP | 1681452 | 7/2006 |

OTHER PUBLICATIONS

ISA European Patent Office, International Search Report of EP07150217, Jun. 2, 2008, 1 page.

* cited by examiner

*Primary Examiner* — Stephen K Cronin
*Assistant Examiner* — Sizo Vilakazi
(74) *Attorney, Agent, or Firm* — Allan J. Lippa; Alleman Hall McCoy Russell & Tuttle LLP

(57) ABSTRACT

The present invention relates to an internal combustion engine that can be operated in a homogeneous charge combustion mode as well as a method and a computer readable storage device for controlling such an engine. The engine comprises at least one fuel injector, a fuel injection controller that controls a fuel amount injected into a first cylinder, and a piston in the first cylinder whose compression causes an air and fuel mixture to be ignited. The engine further comprises at least one intake valve, at least one exhaust valve, a valve operation controller, and at least one sensor for measuring an engine operation parameter in the first cylinder. The engine is particularly characterized in that the valve operation controller is adapted to determine the opening and closing of the intake and exhaust valves of the first cylinder on the basis of a first fuel injection or injections.

20 Claims, 5 Drawing Sheets

CASCADE CONTROL OF HCCI PHASING

CROSS REFERENCE TO PRIORITY APPLICATION

This present application claims priority to European Application Number 07150217, filed Dec. 20, 2007, entitled "Cascade Control of HCCI Phasing", the entire contents of which are incorporated herein by reference.

TECHNICAL FIELD

The present invention relates to an internal combustion engine that can be operated in a homogenous charge combustion mode as well as a method and a computer readable storage device for controlling such an engine.

BACKGROUND ART

To improve thermal efficiency of gasoline internal combustion engines, lean burn is known to give enhanced thermal efficiency by reducing pumping losses and increasing the ratio of specific heat. Generally speaking, lean burn is known to give low fuel consumption and low NOx emissions. There is a limit, though, at which an engine can be operated with a lean air/fuel mixture because of misfire and combustion instability as a result of a slow burn. Known methods to extend the lean burn limit include improving ignitability of the mixture by enhancing the fuel preparation, for example, using atomised or vaporized fuel, and increasing the flame speed by introducing charge motion and turbulence in the air/fuel mixture.

Another method for operating an engine with a very lean or diluted air/fuel mixture is combustion by auto-ignition, or homogenous charge compression ignition (HCCI). HCCI mode is an engine operation state in which a substantially homogenous charge of fuel and air is compressed by a piston and ignites automatically.

In HCCI mode, when certain conditions are met within a homogenous charge of lean air/fuel mixture during low load, homogenous charge compression ignition can occur wherein bulk combustion takes place initiated simultaneously from many ignition sites within the charge. The temperature is increased by the compression until the entire charge reacts simultaneously. Although not necessary for ideal HCCI combustion, a spark can be used to extend the operational window and stabilize the combustion.

Moreover, in HCCI mode there is no moving flame front like in the spark ignition (SI) mode. Since the ignition occurs at several places at the same time and the charge burns simultaneously, the heat release rate is increased.

The lack of a single flame front reduces temperature and increases the heat release rate, thus increasing the thermal efficiency of the combustion. Moreover, the fact that the mixture can be extremely lean and diluted due to the lack of a flame front increases the pumping and thermal efficiency.

Since a diesel engine in a stratified compression ignition (CI) mode also ignites by auto-ignition, HCCI mode is known as an attempt to make a SI engine work like a more efficient diesel engine. Compared with HCCI mode, CI mode has a substantially stratified charge where ignition occurs at the boundary of unmixed fuel which is injected to initiate combustion. Because the engine injects the fuel at least during the intake phase in HCCI mode, which is earlier than in a CI-mode, the fuel and air will have more time to mix and the charge will consequently be (more) homogenous when ignited.

Furthermore, HCCI mode is an attempt to achieve SI mode like emissions along with the efficiency of CI mode. For example, in the HCCI mode the engine can work in homogenous lean and/or diluted operation. The homogenous lean charge of fuel and air leads to a cleaner combustion and lower emissions. The propagating flame in SI mode and the stratified charge in CI mode result in a highly heterogeneous burnt gas temperature within the charge, thus resulting in very high local temperature values. This, for instance, creates high NOx emissions. The homogenous combustion uniformly distributed throughout the charge in the HCCI from many ignition sites results in lower temperature values and extremely low NOx emission.

In some parts of the operation window, the HCCI combustion mode has the disadvantage of higher carbon monoxide (CO) and hydrocarbon (HC) emissions compared to SI and CI mode. Other disadvantages include high peak pressure and limited power range.

A further disadvantage with the HCCI mode is the difficulty to control the timing of the auto-ignition. The location (e.g., timing) of the peak pressure, which is related to auto-ignition timing, needs to be controlled to take place between approximately 4 and 8 degrees after piston top dead center (TDC) of the compression stroke. This is to optimize fuel consumption and emissions, and to avoid knocking combustion or partial burn/misfire. Also, NOx emissions will be significantly lower if the timing control of the auto-ignition is working.

In SI mode, the spark controls the ignition timing while, in CI mode, the fuel injected into compressed air initiates the ignition. In HCCI mode, the mixture of fuel and air will auto-ignite whenever certain conditions are met, such as when the temperature is sufficiently high; thus, there is no initiator such as a spark or fuel injection to start the combustion.

One main control parameter used is control of the timing of the valves, which is known as variable valve timing (VVT). In VVT, the timing of the intake and/or exhaust valves can be changed during operation. The valves may be controlled in different ways, for example, by using independently controlled valves or by controlling the camshaft angle, which is known as variable camshaft timing (VCT).

Variable valve timing can, for instance, control the amount of residuals captured in the chamber by changing the valve overlap. It is believed that the high proportion of burnt gases remaining in the chamber from the previous combustion is responsible for providing the hot charge temperature and active fuel radicals necessary to promote HCCI in a very lean air/fuel mixture. In four-stroke engines, because the residual content is low, HCCI is more difficult to achieve, but can be induced by heating the intake air to a high temperature or by significantly increasing the compression ratio. This effect can also be achieved by retaining a part of the hot exhaust gas, or residuals, for example, by said controlling of the timing of the intake and exhaust valves or by re-circulating the exhaust gases.

One example of a VVT system for increasing the proportion of burnt gases in the chamber is disclosed in US 2002/0134333. The document discloses an exhaust gas recirculation (EGR) passage that re-circulates exhaust gases in an exhaust pipe of an engine to an intake system by negative intake-gas pressure. An intake cam that opens and closes an intake valve is provided so that a phase angle of the intake cam may be adjusted. The phase angle of the intake cam is adjusted in accordance with an increase or decrease of a flow rate of recirculation of exhaust gases. The valves of all cylinders are controlled at the same time instead of individually.

Another example of a VVT system for increasing the proportion of burnt gases in the chamber is described in document EP 1435 442. During the compression ignition mode, the exhaust valve (EV) is adapted to be closed before TDC during the exhaust stroke of the piston while the intake valve (IV) is opened after TDC during the same stroke. This is called a negative valve overlap (NVO) and occurs during the gas exchange phase. Thereby, residual exhaust gases are kept in the chamber which increases the heat in the chamber and consequently initiates the auto-ignition in the compression stroke.

EP 1435 442 also describes the use of at least one pilot injection which is injected before TDC during the NVO and, further, at least one main injection injected after TDC during the NVO but before TDC of the compression stroke. The fuel from the pilot injection will react in the residual exhaust gas, forming radicals, intermediates or combustion products. This reaction can be exothermic, hence, heating the residuals, resulting in earlier timing of the auto-ignition temperature.

In order to control these injections, EP 1435 442 describes the use of at least one sensor to measure engine operation parameters including a combustion chamber pressure sensor, an intake manifold pressure sensor and a λ-probe in the exhaust conduit, as well as temperature sensors for intake air, engine coolant and engine oil. Knocking is detected by measuring the peak pressure and/or pressure variations in the chamber. A controller evaluates the signals from sensors that indicate knock and combustion stability. A knock signal is deemed to be high if the filtered peak pressure during combustion exceeds an expected pressure level. When a coefficient of variation (COV) signal is high, this is indicated by variation of location peak pressure.

The ability to control the combustion phasing of an HCCI internal combustion engine is vital. The location (i.e., timing) of the peak pressure (approximately 50% burnt angle) needs to be controlled, for example, between 4 and 8 degrees after TDC. This is to avoid knocking sound which damages the engine in the long run. This is also to avoid combustion instability or high indicated mean effective pressure coefficient of variation (IMEP COV). Also, NOx emissions will be significantly lower if the control is working.

SUMMARY

The object of the present invention is, therefore, to provide an improved controlling of the auto-ignition in an engine operating in HCCI.

The object is achieved by an internal combustion engine provided with at least a first cylinder. The engine comprises at least one fuel injector through which fuel is introduced into a combustion chamber for the first cylinder, a fuel injection controller that at least controls a fuel amount injected into the first cylinder and a piston in the first cylinder whose compression causes an air and fuel mixture to be ignited. The engine further comprises at least one intake valve admitting air into the first cylinder, at least one exhaust valve for exhausting combusted gases from the first cylinder and at least one sensor for measuring an engine operation parameter in the first cylinder.

A valve operation controller is adapted to close the exhaust valve or valves before top dead center during an exhaust stroke of the piston in the first cylinder and open the intake valve or valves between top dead center of the exhaust stroke and top dead center of a compression stroke in the first cylinder. The fuel injection controller is adapted to control at least the fuel injection amount so as to perform at least one first fuel injection in the first cylinder before top dead center of the piston exhaust stroke in the first cylinder and at least one second fuel injection in the first cylinder between top dead center of the exhaust stroke and top dead center of the compression stroke in the first cylinder. In order to solve the above mentioned problems, the engine is particularly characterized in that the valve operation controller is adapted to determine the opening and closing of the valves of the first cylinder on the basis of the first fuel injection or injections.

The object is also achieved by means of a method for operating an internal combustion engine provided with at least a first cylinder. The engine comprises at least one fuel injector through which fuel is introduced into the combustion chamber for the first cylinder, a fuel injection controller that at least controls the fuel amount injected into the first cylinder and a piston in the first cylinder whose compression causes an air and fuel mixture to be ignited. The engine further comprises at least one intake valve admitting air into the first cylinder, at least one exhaust valve for exhausting combusted gases from the first cylinder and at least one sensor for measuring an engine operation parameter in the first cylinder.

A valve operation controller performs the steps of closing the exhaust valve or valves before top dead center during the exhaust stroke of the piston in the first cylinder and opening the intake valve or valves between top dead center of the exhaust stroke and top dead center of the compression stroke in the first cylinder. A fuel injection controller performs the steps of controlling the fuel injection amount so as to perform at least one first fuel injection in the first cylinder before top dead center of the piston exhaust stroke in the first cylinder and at least one second fuel injection in the first cylinder between top dead center of the exhaust stroke and top dead center of the compression stroke in the first cylinder. In order to solve the above mentioned problems, the method is particularly characterized in that the valve operation controller determines the opening and closing of the valves of the first cylinder on the basis of the first injection or injections.

The object is finally achieved by means of a computer readable storage device having stored data representing instructions executable by a computer to operate an internal combustion engine provided with at least a first cylinder. The engine comprises at least one fuel injector through which fuel is introduced into the combustion chamber for the first cylinder, a fuel injection controller that at least controls the fuel amount injected into the first cylinder and a piston in the first cylinder whose compression causes an air and fuel mixture to be ignited. The engine further comprises at least one intake valve admitting air into the first cylinder, at least one exhaust valve for exhausting combusted gases from the first cylinder and at least one sensor for measuring an engine operation parameter in the first cylinder.

The computer readable storage device comprises instructions for closing the exhaust valve or valves before top dead center during the exhaust stroke of the piston in the first cylinder and opening the intake valve or valves between top dead center of the exhaust stroke and top dead center of the compression stroke in the first cylinder. The computer readable storage device further comprises instructions for controlling at least the fuel injection amount so as to perform at least one first fuel injection in the first cylinder before top dead center of the piston exhaust stroke in the first cylinder and at least one second fuel injection in the first cylinder between top dead center of the exhaust stroke and top dead center of the compression stroke in the first cylinder. In order to solve the above mentioned problems, the computer readable storage device is particularly characterized in that it further comprises instructions for determining the opening and closing of the valves of the first cylinder on the basis of the first injection or injections.

In another embodiment, the above issues may be at least partially addressed by a method for operating an internal combustion engine having direct fuel injection and adjustable cylinder intake valve and/or exhaust valve operation, the method comprising: injecting a first fuel injection amount into a cylinder of the engine during a cycle of the cylinder; injecting a second fuel injection amount into the cylinder of the engine during the cycle of the cylinder; homogenously combusting at least one of the first and second fuel injection amounts; adjusting an amount or timing of the first fuel injection in response to combusting timing; and adjusting a valve opening or closing timing of at least one of the cylinder valves in response to the adjustment of the first injection.

The advantage of the present invention is that the advantages of pilot injection (e.g., fast controlling, cylinder individual) and VCT (e.g., slow controlling, all cylinders at the same time) can be combined in order to achieve an automatic controlling of the auto-ignition in HCCI mode. The correct timing will further reduce the fuel consumption.

BRIEF DESCRIPTION OF DRAWINGS

In the following text the invention will be described in detail with reference to the attached drawings. These drawings are used for illustration only and do not in any way limit the scope of the invention:

FIG. 2 illustrates a four-stroke cycle, including a piston intake stroke, compression stroke, expansion stroke, and exhaust stroke over 720 degrees crank, which in this example constitutes one cylinder cycle

DETAILED DESCRIPTION

The present invention will now be described with reference to an embodiment. The embodiment described consists in an internal combustion engine that can be operated in a homogenous charge combustion mode. The engine according to the embodiment is adapted to perform certain steps and thereby provides an improved controlling of an auto-ignition in an engine operating in HCCI. It should be understood by a person skilled in the art that the method and the computer readable storage device included in the present invention enable the controlling of the steps performed by said engine.

Figure 1:
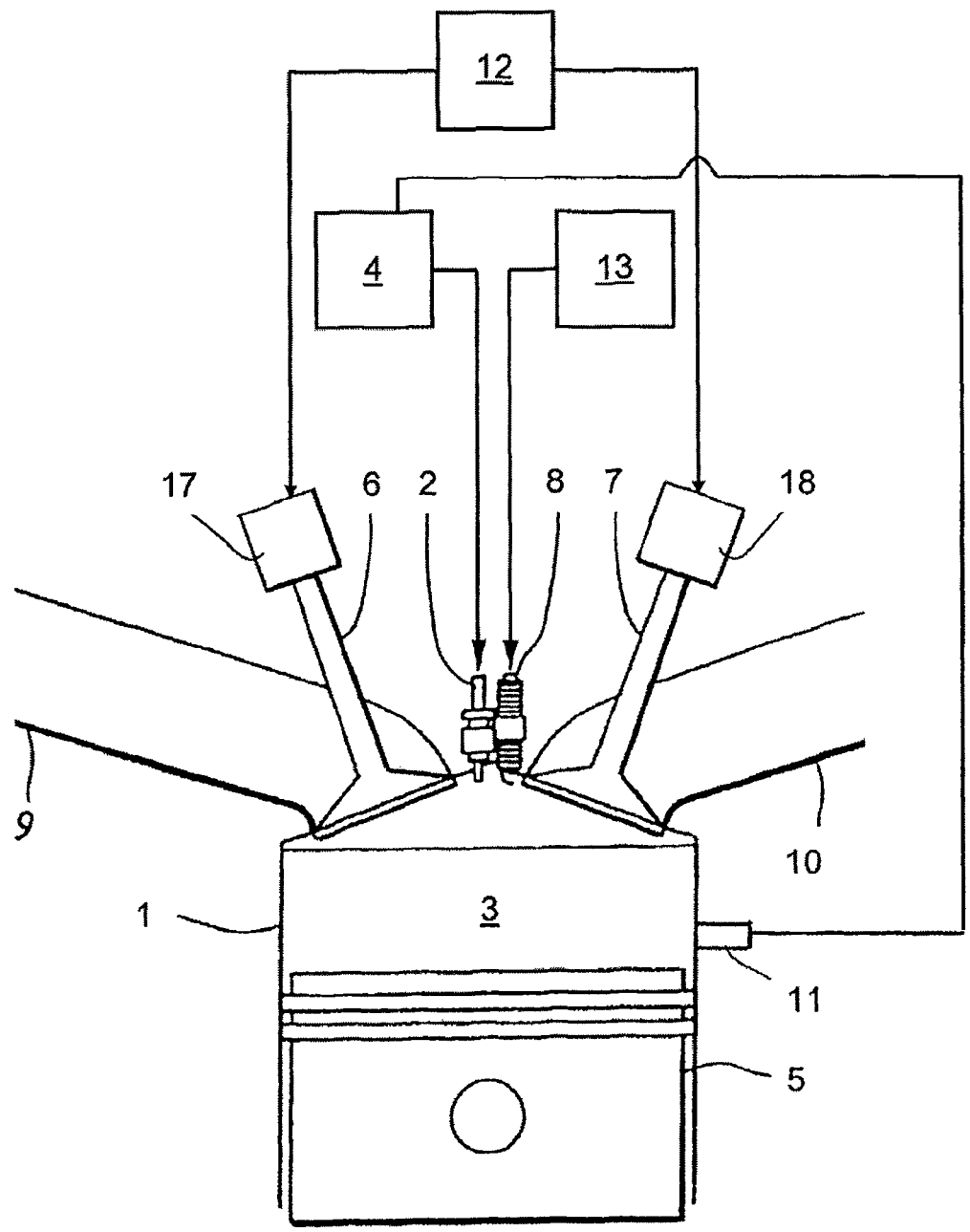
FIG. 1 shows a schematic view of an internal combustion engine according to the invention

FIG. 1 shows a schematic view of an internal combustion engine according to the invention. The engine is a four stroke engine and is provided with at least a first cylinder 3. The engine comprises at least one fuel injector 2 through which fuel is introduced directly into the combustion chamber for the first cylinder. There is one injector per cylinder.

The engine further comprises a fuel injection controller 4 which at least controls a fuel amount injected into the first cylinder 3 and a piston 5 in the first cylinder whose compression causes an air and fuel mixture to be ignited. The controller 4 may also control other parameters such as fuel injection timing. This means that the engine operates in a compression ignition mode where the mixture is ignited based on at least fuel concentration, pressure and temperature, amongst other variables.

The engine further comprises at least one intake valve 6 for admitting air into the first cylinder 3 and at least one exhaust valve 7 for exhausting combusted gases from the first cylinder. The engine further comprises at least one sensor for measuring an engine operation parameter in the first cylinder. The number of sensors in the engine is not vital for the invention. However, as will be described below, there is an advantage if a pressure sensor measuring the pressure in the cylinder 11 is used. Air is supplied to the first cylinder 3 through an intake conduit 9 connected to an intake manifold while exhaust gas is exhausted through an exhaust conduit 10. In HCCI mode, there is an option that a spark plug 8, controlled by a sparking unit 13 assists the auto-ignition.

Figure 2:
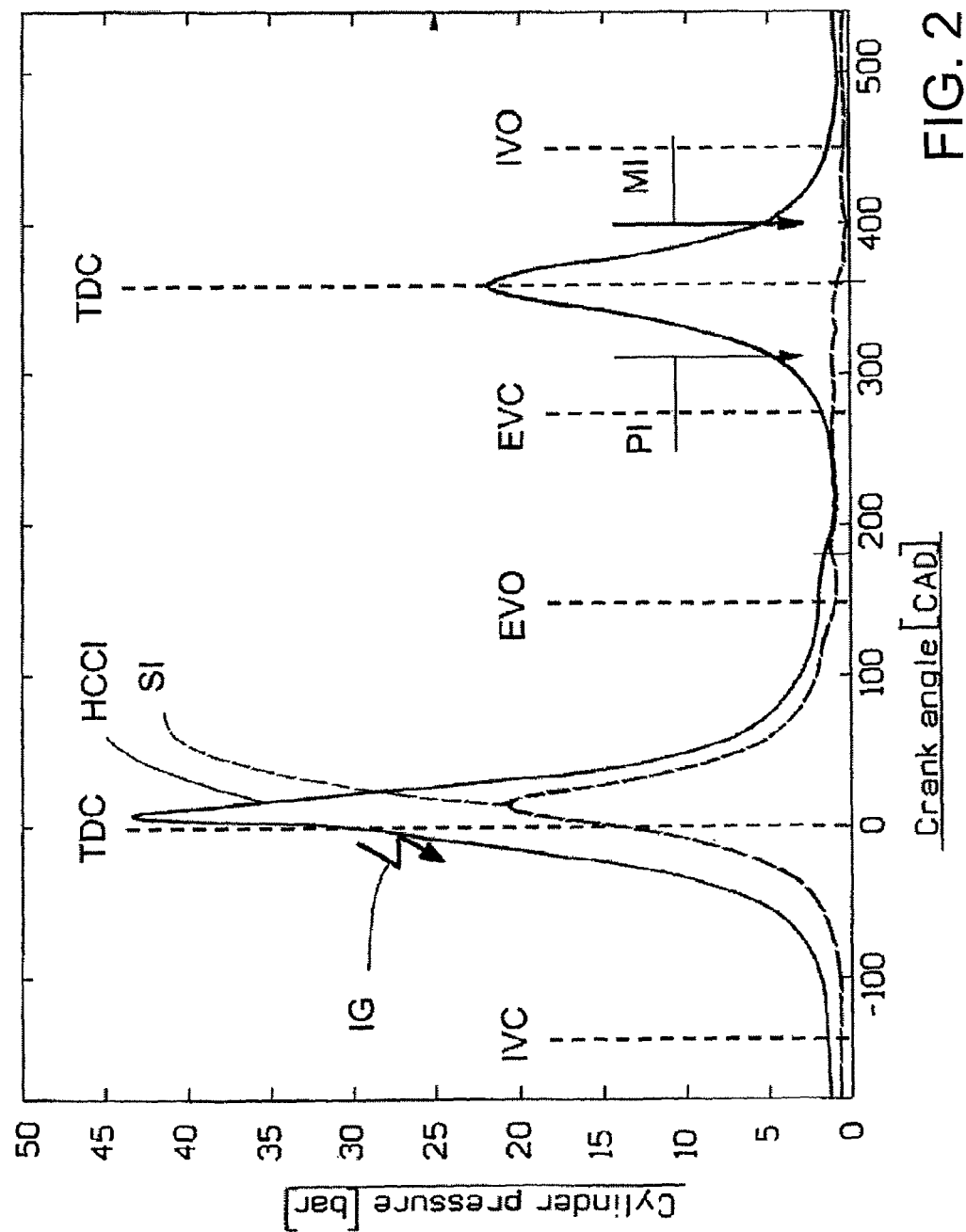
FIG. 2 shows a diagram illustrating the variation of cylinder pressure over crank angle for HCCI and SI mode.

The engine according to the present invention further comprises a valve operation controller 12 that is adapted to close, see FIG. 2, the exhaust valve or valves 7 (e.g., exhaust valve closing, EVC) before top dead center (e.g., at 360 degrees crank angle, TDC), during an exhaust stroke of the piston 5 in the first cylinder 3. Moreover, the intake valve or valves 6 are opened (e.g., intake valve opening, IVO) between top dead center of the exhaust stroke and top dead center (e.g., at 0 degrees crank angle) of a compression stroke in the first cylinder.

The valve operation controller 12 controls the intake valve 6 and exhaust valve 7 by means of valve actuators 17 and 18. The actuators may be electrically, mechanically or hydraulically operated. The controlling of the valves 6, 7 will be described later in the specification.

The fuel injection controller 4 is adapted to control the fuel injection amount (e.g., of the pilot fuel injection, PFO) so as to perform at least one first fuel injection PI, see FIG. 2, in the first cylinder 3 before top dead center (e.g., at 360 degrees crank angle) of the piston exhaust stroke in the first cylinder and at least one second fuel injection MI in the first cylinder between top dead center of the exhaust stroke and top dead center (e.g., at 0 degrees crank angle) of the compression stroke in the first cylinder.

As mentioned, the ability to control the combustion phasing of an HCCI internal combustion engine is vital. The location (e.g., timing) of the peak pressure (approximately 50% burnt angle) needs to be controlled between approximately 4 and 8 degrees after piston TDC (i.e., compression) depending on, for example, the value of pressure rise per crank-angle, NOx emissions and/or IMEP COV. This is to avoid knocking sound which damages the engine in the long run. This is also to avoid combustion instability or high IMEP COV.

One main control parameter used for control combustion phasing is the control EVC,IVO,IVC,EVO, see FIG. 2, of the valves 6,7 by VVT in the form of variable camshaft timing. Another main control parameter is the introduction of a pilot fuel injection PI. VCT controls the valves via a camshaft, one shaft for the intake valves and one shaft for the exhaust valves. This means that all of the intake valves of all of the cylinders are controlled at the same time and all of the exhaust valves of all of the cylinders are controlled at the same time The problem is that the two parameters differ a lot in the way they interact with the combustion. The pilot fuel injection PI, see FIG. 2, is cylinder individual and fast. If changed, the next combustion on that cylinder 3 will be affected, but the control widths are limited. The variable cam timing EVC, IVO,IVC,EVO, on the other hand, controls all cylinders at the same time but is slower, in the area of a couple of revolutions.

The aim of the present invention is to solve the problem of controlling auto-ignition by using these two parameters controlled by the valve operation controller 12 and the fuel injection controller 4 together. What, therefore, particularly characterizes the present invention is that the valve operation controller 12 is adapted to determine the opening IVO,EVO and closing IVC,EVC, see FIG. 2, of the valves 6, 7 of the first cylinder 3 on the basis of the first injection or injections PI.

This means that the valve operation controller 12 is adapted for collecting information about the first injection parameters PI (e.g., amount of fuel injected) as input data for the controlling of the valves 6,7. Further details of this collection will be described later.

Determining the opening IVO,EVO and closing IVC,EVC, see FIG. 2, of the valves 6,7 on the basis of the first injection or injections PI is a way to make the control of the valves and the first injections cooperate in order to avoid oscillations. An advantage is that the advantages of pilot injection (e.g., fast controlling, cylinder individual) and VCT (e.g., slow controlling, all cylinders at the same time) can be combined in order to achieve a more sufficient automatic controlling of the auto-ignition in HCCI mode.

In the combustion engine according to the present invention, the fuel is injected directly into the cylinder.

The controlling of the first (pilot) injections PI will now be described. The fuel injection controller 4, see FIGS. 1 and 3, according to a first embodiment within the present invention, is adapted to determine at least the amount of fuel injected in the first cylinder 3 during the first injection or injections PI on the basis of a comparison 14 between a set point value SP-LPP of the timing of the peak pressure in the first cylinder and an actual peak pressure timing value LPP in the cylinder. The set point value is the target value that the fuel injection controller will aim to reach. The location of the peak pressure is the location of a maximum in the cylinder pressure that is caused by combustion and, therefore, attained after the air/fuel mixture is ignited. There should be a 100% correlation to a mass fraction burned value.

The timing of the peak pressure, which is when the auto-ignition takes place, needs to be controlled between approximately 4 and 8 degrees after top dead center in the compression stroke (e.g., at 0 degrees crank angle). This is to avoid knocking sound and to avoid combustion instability or high IMEP COV.

The set point value SP-LPP is dependent on the engine operations scheme/map which in turn depends on the operating conditions for the engine. The fuel injection controller 4 will consequently be adapted for bringing in the current set point peak pressure timing value, reading the actual peak pressure timing value LPP and, if the actual peak pressure in the first cylinder differs from the set point timing value in the first cylinder, the fuel injection controller will at least change the amount pilot fuel output (PFO) of fuel injected in the first cylinder during the first injection or injections PI.

Figure 3:
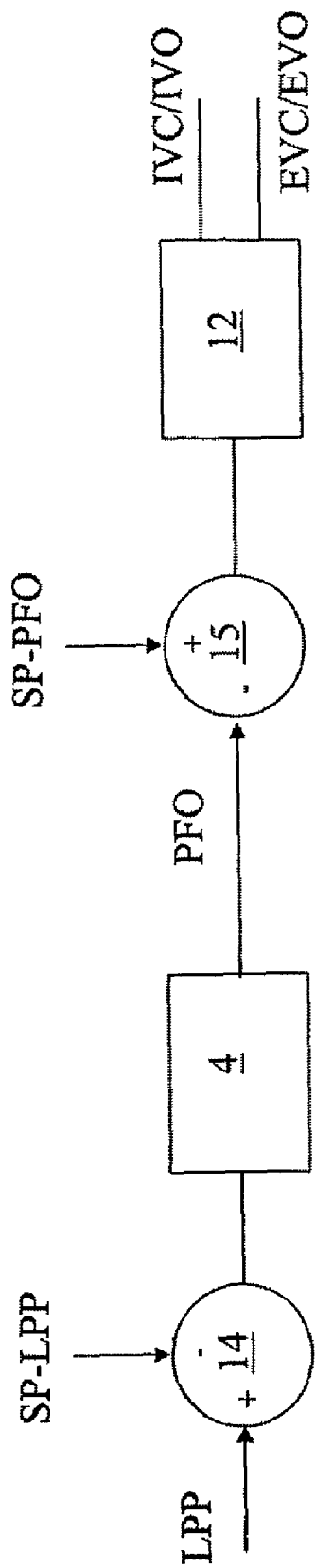
FIG. 3 shows a schematic view of the cooperation between the fuel injection controller and the valve operation controller.

The fuel injection controller 4, see FIGS. 1 and 3, is adapted for at least determining the amount PFO of the first injection or injections PI in the first cylinder 3 in the subsequent exhaust stroke in the first cylinder following the comparison 14 of the timing values LPP and SP-LPP of the peak pressure. This means that the control is cylinder individual and fast. If the actual timing value LPP of the peak pressure in the first cylinder is changed, the controller 4 will at least change the amount PFO of fuel in the first (pilot) injection PI in the first exhaust phase and/or a subsequent exhaust phase following the ignition.

The fuel injection controller 4 compares the timing values LPP with the SP-LPP of the peak pressure for each cylinder individually. This comparison is performed at each combustion stroke. The actual peak pressure timing value LPP is known by the controller, approximately 40-50 degrees after the TDC for each combustion. The degree internal depends on the engine number of revolutions etc. It will take some time for the controller 4 to perform the comparison and send out the control signal for the PFO for the next combustion by that cylinder. This can vary from time to time. Therefore, if the controller is fast, it changes the control signal for the first (pilot) injection PI in the first exhaust phase following the ignition. It may also be that the control signal is changed for a subsequent exhaust phase.

There are many ways to detect the location peak pressure. In the present invention, a pressure sensor 11 is arranged that detects the pressure in the first cylinder 3 and transmits the actual timing value of the peak pressure LPP to the fuel injection controller 4. There are many other ways to detect the location peak pressure, and it should be understood by a person skilled in the art that none of these ways are excluded in the present invention.

The scope of the present invention is that the valve operation controller 12 is adapted to determine the opening IVO, EVO and closing IVC,EVC, see FIG. 2, of the valves of the first cylinder 3 on the basis of the first injection or injections PI. The valve operation controller 12 is, therefore, adapted to determine the opening IVO,EVO and closing IVC,EVC, see FIG. 2, of the valves 6,7 of the first cylinder 3 at least on the basis of the comparison 15 between a set point value SP-PFO for the amount of fuel injected in the first cylinder during the first injection or injections and an actual amount PFO of fuel injected in the first cylinder during the first injection or injections PI.

This means that instead of looking into other parameters such as knocking, temperature or pressure, the controller 12 will make sure it is dependent on the first (i.e., pilot) fuel injections PI. The valve control is consequently indirectly dependent on the location peak pressure LPP. The valve operation controller establishes set points for the opening IVO,EVO and the closing IVC, EVC of the valves 6, 7 based on the output IVO/IVC for the intake valve(s) of the first cylinder and the output EVO/EVC for the exhaust valve(s) of the first cylinder, respectively.

The fuel injection controller and the valve operation controller are coupled in cascade, see FIG. 3, first the fuel injection controller 4 and then the valve operation controller 12. This enables the valve operation controller to at least collect data from the fuel injection controller about the actual amount PFO of fuel injected during the pilot injection in the first cylinder and compare 15 it with a set point value SP-PFO for the amount of fuel.

The engine uses a Proportional Integral Derivative (PID) controller as the valve operation controller 12 together with the pilot injection controller 4 to give a new valve control output for every sample. PID is a generic control loop feedback mechanism widely used in combustion engines. A PID controller attempts to correct the error between a measured process variable and a desired set point by calculating and then outputting a corrective action that can adjust the process accordingly.

Since the valve operation control 12 controls with inputs from a floating average value for injections, it will, in most, cases be slower than the fuel injection controller 4. As another difference, due to the VCT, the valve operation control controls the valve timing for all cylinders at the same time, in contrast to the fuel injection controller for which cylinder control is individual.

The valve operation controller 12 is adapted to determine the adjustment of the valves 6, 7 within at least two revolutions of the piston after the comparison 15 of the first injection or injections PI. This means that the control of the valves 6, 7 is not as fast as the fuel injection control. The reason is that if, for example, VCT is used, the system needs some time to change the angle of the camshaft. Other kinds of VVT also need some time to make this change. In contrast, the fuel injectors can quickly respond to changed conditions.

The variable valve timing system may be a variable camshaft timing system. This means that the valve operation controller is adapted to control the opening and closing of the intake valve or valves of the engine via an intake valve camshaft and the opening and closing of the exhaust valve or valves of the engine via an exhaust valve camshaft. The control of the intake valves is independent of the control of the exhaust valves.

Figure 4:
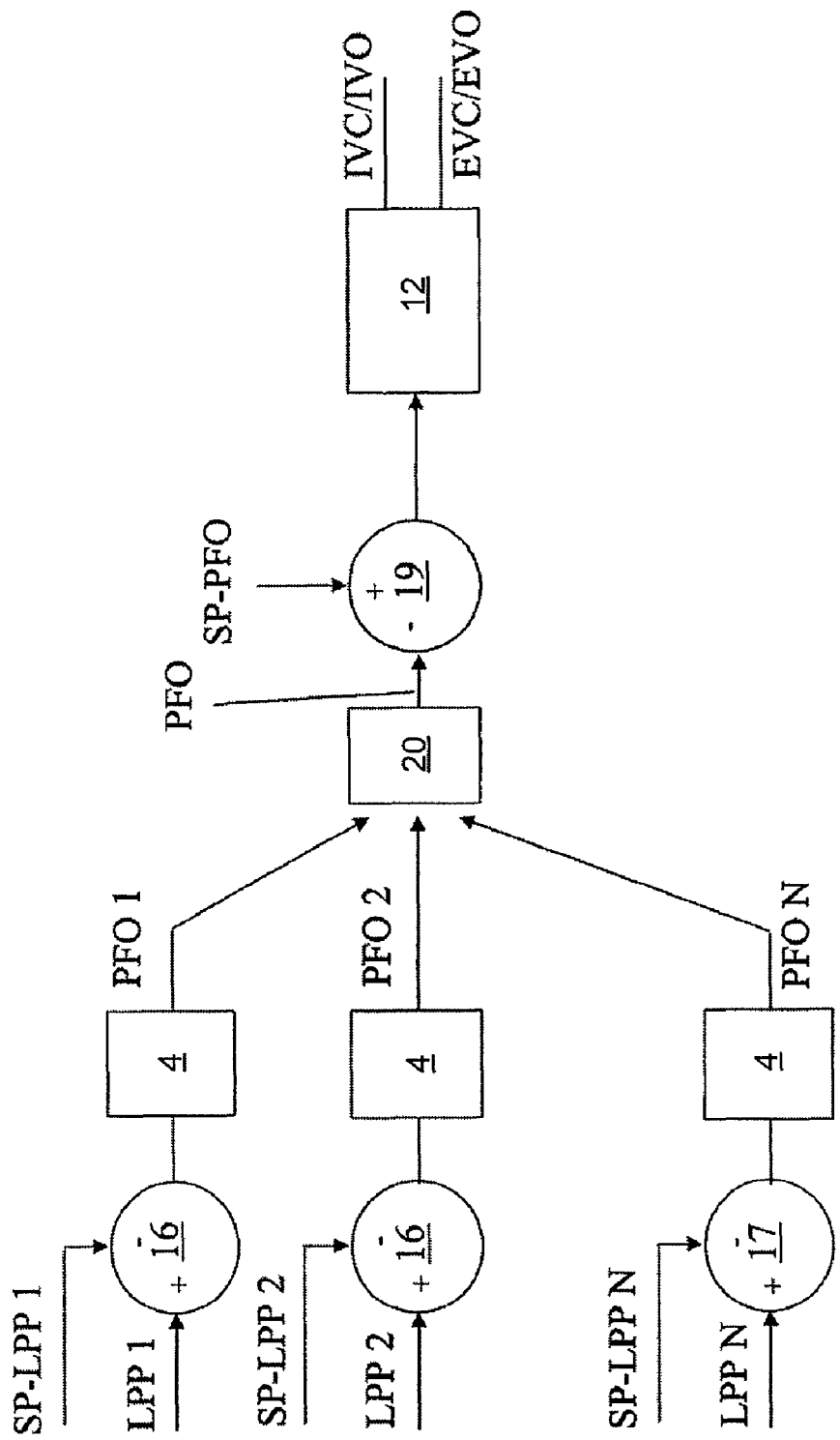
FIG. 4 shows a schematic view of the cooperation between the fuel injection controller and the valve operation controller illustrated for more than one cylinder.

FIG. 4 shows a schematic view of the cooperation between the fuel injection controller and the valve operation controller illustrated for more than one cylinder. Therefore, FIG. 4 is equivalent with FIG. 3 except that FIG. 4 shows the controlling of the injection and the valves for more than one cylinder. The fuel injection controllers 4, see also FIGS. 1 and 3, are adapted to at least determine the amount of fuel injected PFO1/PFO2/PFON in the respective cylinder (e.g., one, two, up to N cylinders) during the first injection or injections PI on the basis of a comparison 16 between a set point value SP-LPP1/SP-LPP2/SP-LPPN of the timing of the peak pressure in the respective cylinder and the actual LPP1/LPP2/LPPN peak pressure timing value in the cylinder. The operation of the fuel injection controllers 4 are described in accordance with FIG. 3.

Also described in accordance with FIG. 3, the fuel injection controller 4 is adapted for determining the amount PFO of the first injection or injections PI in the first cylinder 3 in the subsequent exhaust stroke in the first cylinder following the comparison 14 of the timing values LPP and SP-LPP of the peak pressure. This means that the control is cylinder individual and fast.

The scope of the present invention is that the valve operation controller 12 is adapted to determine the opening IVO, EVO and closing IVC, EVC of the valves of the cylinder 3 on the basis of the first injection or injections PI. FIG. 4 shows a single valve operation controller for all cylinders. This is the case when VCT is used, which is where the valves are controlled via the intake valve camshaft and the exhaust valve camshaft. The controller consequently controls the valves by controlling the camshafts. The valve operation controller 12 is, as shown in FIG. 4, adapted to determine the opening IVO, EVO and closing IVC, EVC, see FIG. 2, of the valves 6, 7 of all the cylinders 1-N at least on the basis of a comparison 19 between a set point value SP-PFO for the amount of fuel injected during the first injection or injections in the cylinder and the mean value of the actual amount PFO of fuel injected in the cylinders during the first injection or injections PI.

As shown in FIG. 4, the moving average value PFO of the actual amount of fuel injected is calculated 20 on the basis of the actual value PFO1, PFO2, PFON from all cylinders. The valve operation controller establishes set points for the opening IVO,EVO and the closing IVC, IVC of the valves 6, 7 based on the output IVO/IVC for the intake valve(s) of the cylinders and the output EVO/EVC for the exhaust valve(s) of the cylinders, respectively.

Figure 5:
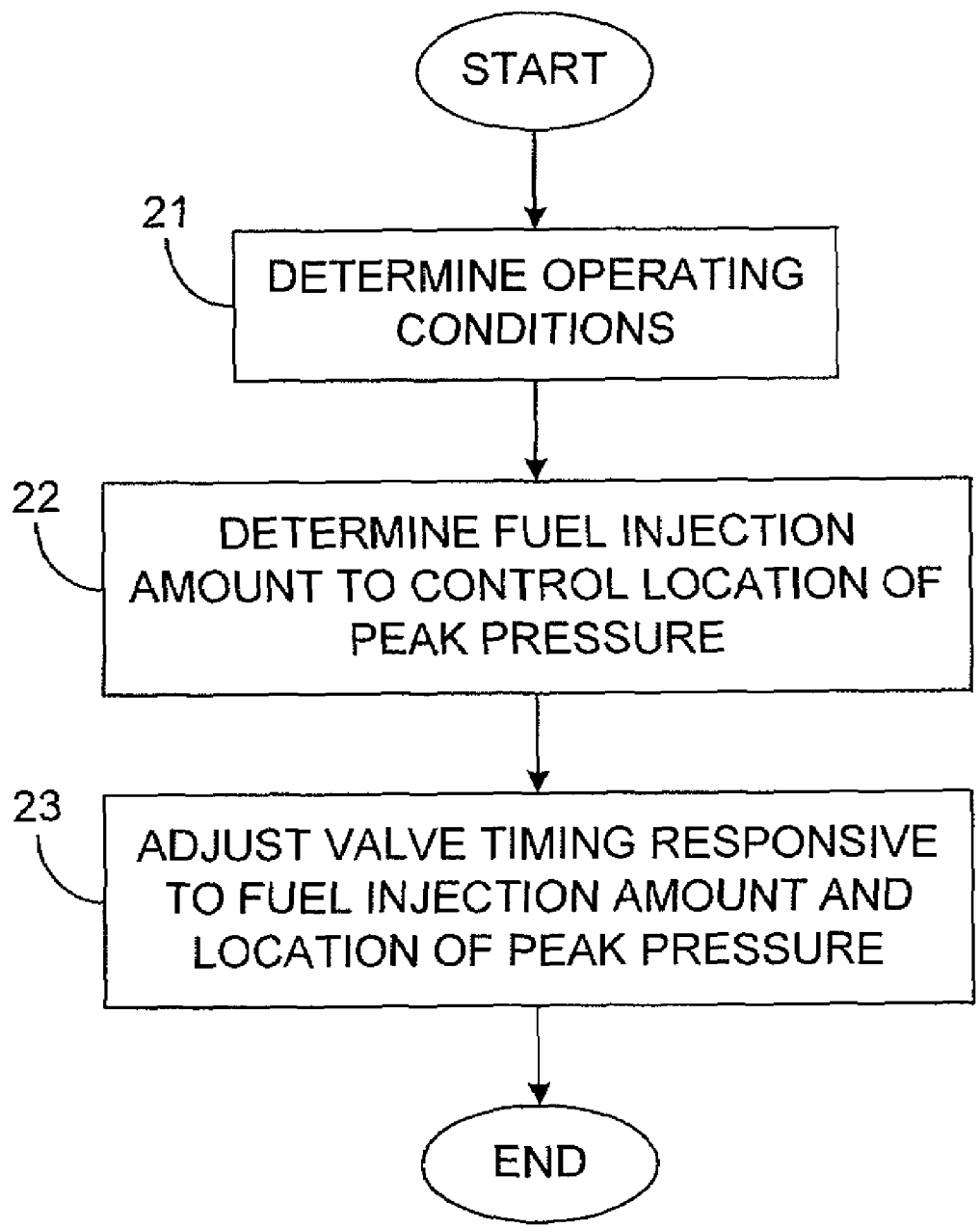
FIG. 5 shows a flow chart that illustrates a method for controlling the auto-ignition of an engine operating in HCCI mode.

FIG. 5 shows a flow chart that illustrates a method for controlling the auto-ignition of an engine operating in HCCI mode. First, the operating conditions of the engine are determined 21. Next, the fuel injection controller determines the amount of the pilot fuel injection in order to control the location of peak pressure 22. The fuel injection amount is determined based on a comparison between the set point value SP-LPP of the timing of the peak pressure and the actual timing value LPP of the peak pressure, as described above. Once the fuel injection amount is determined, the valve operation controller adjusts the timing (e.g., the opening and closing timing) of the intake and exhaust valves based on the pilot fuel injection amount 23. The timing of the valves is adjusted in response to a comparison between a set point value SP-PFO for the amount of fuel injected and the actual amount PFO of fuel injected during the pilot injection. In this way, it is possible to take advantage of the faster pilot injection control of injection timing, while still maintaining, on average, the desired amount of fuel injection to provide the desired engine output torque (e.g., via corresponding adjustment of the valve timings).

It will also be appreciated by the person skilled in the art that various modifications may be made to the above-described embodiments without departing from the scope of the present invention. Location of peak pressure is used as an example. Other measures can be used to indicate the combustion phasing. For example, mass fraction burned locations (CAn where n=[1:99]), location of pressure rise/crank angle, changes of the rotational speed/crank angle, etc. Consequently, there are other means for controlling the fuel injection amount.

The invention claimed is:

1. A computer readable storage device having stored data representing instructions executable by a computer to operate an internal combustion engine provided with at least a first cylinder, which engine comprises at least one fuel injector through which fuel is introduced into a combustion chamber for the first cylinder, a piston in the first cylinder whose compression causes an air and fuel mixture to be ignited, at least one intake valve admitting air into the first cylinder, at least one exhaust valve for exhausting combusted gases from the first cylinder, and at least one sensor for measuring an engine operation, parameter in the first cylinder, the computer readable storage device comprising:

instructions for a valve operation controller to close the exhaust valve before top dead center during an exhaust stroke of the piston in the first cylinder and open the intake valve between top dead center of the exhaust stroke and top dead center of a compression stroke in the first cylinder;

instructions for a fuel injection controller to control a fuel amount injected into the first cylinder to perform at least one first fuel injection in the first cylinder before top dead center of the piston exhaust stroke in the first cylinder and at least one second fuel injection in the first cylinder between top dead center of the piston exhaust stroke and top dead center of the compression stroke in the first cylinder; and instructions for the valve operation controller to determine the opening and closing of the valves of the first cylinder on the basis of the first injection or injections.

2. The computer readable storage device according to claim 1 wherein the fuel is injected directly into the first cylinder.

3. The computer readable storage device according to claim 2, further comprising instructions for the fuel injection controller to determine the amount of fuel injected in the first cylinder during the first injection or injections on the basis of a comparison between a set point value of the timing of a peak pressure in the first cylinder and an actual peak pressure timing value in the first cylinder.

4. The computer readable storage device according to claim 3, further comprising instructions for the fuel injection controller to change the amount of fuel injected in the first cylinder during the first injection or injections if the actual peak pressure timing value in the first cylinder differs from the set point timing value in the first cylinder.

5. The computer readable storage device according to claim 4, further comprising instructions for the fuel injection controller to determine the amount of the first injection or injections in the first cylinder in a first exhaust phase and/or a subsequent exhaust phase in the first cylinder following the comparison of the timing values of the peak pressure.

6. The computer readable storage device according to claim 5, further comprising instructions for a pressure sensor in the first cylinder to transmit the timing value of the peak pressure in the first cylinder.

7. The computer readable storage device according to claim 5, further comprising instructions for the valve operation controller to determine the opening and closing of the valves of the first cylinder on the basis of a comparison between a set point value for the amount of fuel injected in the first cylinder during the first injection or injections and the actual amount of fuel injected in the first cylinder during the first injection or injections.

8. The computer readable storage device according to claim 7 wherein the fuel injection controller and the valve operation controller are coupled in cascade, first the fuel injection controller and after that the valve operation controller.

9. The computer readable storage device according to claim 7, further comprising instructions for the valve operation controller to determine the opening and closing of the valves of all cylinders in the engine on the basis of the comparison between a set point value for the amount of fuel injected in the cylinders during the first injection or injections and the mean value for the actual amount of fuel injected in the cylinders during the first injection or injections.

10. The computer readable storage device according to claim 9, further comprising instructions for the valve operation controller to determine the opening and closings of the valves within at least two revolutions of the piston after the comparison of the first injection or injections.

11. The computer readable storage device according to claim 9, further comprising instructions for the valve operation controller to control the opening and closing of the intake valve or valves of the engine via an intake valve camshaft and the exhaust valve or valves of the engine via an exhaust valve camshaft, the control of the intake and exhaust valves being independent from each other.

12. The computer readable storage device according to claim 9, further comprising instructions for the valve operation controller to control the opening and closing of the valves of each cylinder individually.

13. A method for operating an internal combustion engine having direct fuel injection and adjustable cylinder intake valve and/or exhaust valve operation, the method comprising:
    injecting a first fuel injection amount into a cylinder of the engine during a cycle of the cylinder;
    injecting a second fuel injection amount into the cylinder of the engine during the cycle of the cylinder;
    homogenously combusting at least one of the first and second fuel injection amounts;
    adjusting an amount or timing of the first fuel injection in response to combusting timing; and
    adjusting a valve opening or closing timing of at least one of the cylinder valves in response to the adjustment of the first injection.

14. The method according to claim 13 further comprising adjusting the first fuel injection amount in response to a set point value of the timing of a peak pressure in the cylinder and an actual peak pressure timing value in the cylinder.

15. The method according to claim 13 further comprising adjusting the first fuel injection amount on a cylinder-by-cylinder basis, and adjusting the valve timing for a plurality of cylinders.

16. The method of claim 15 wherein the first fuel injection occurs during an exhaust stroke of the cylinder.

17. The method of claim 16 wherein the second fuel injection occurs during an intake stroke of the cylinder.

18. The method of claim 13 wherein the adjustment of the valve timing maintains an average amount of injected fuel of the first injection at a desired value.

19. The method according to claim 18 wherein at least one exhaust valve of the cylinder closes before top dead center during an exhaust stroke of the cylinder and at least one intake valve of the cylinder opens between top dead center of the exhaust stroke and top dead center of a compression stroke of the cylinder, and wherein the first fuel injection in the cylinder occurs before top dead center of the exhaust stroke and the second fuel injection occurs between top dead center of the exhaust stroke and top dead center of the compression stroke in the cylinder.

20. A computer readable storage device having stored data representing instructions executable by a computer to operate an internal combustion engine provided with at least a first cylinder, which engine comprises at least one fuel injector through which fuel is introduced into the combustion chamber for the first cylinder, a fuel injection controller that at least controls the fuel amount injected, a piston in the first cylinder whose compression causes an air and fuel mixture to be ignited, at least one intake valve admitting at least air into the first cylinder, at least one exhaust valve for exhausting combusted gases from the first cylinder, and at least one sensor for measuring an engine operation parameter in the first cylinder, the computer readable storage device comprising:
    instructions for closing the exhaust valve or valves before top dead center during an exhaust stroke of the piston in the first cylinder and open the intake valve or valves between the top dead center of the exhaust stroke and the top dead center of a compression stroke in the first cylinder; and
    instructions for controlling at least the fuel injection amount so as to perform at least one first fuel injection in the first cylinder before top dead center of the piston exhaust stroke in the first cylinder and at least one second fuel injection in the first cylinder between the top dead center of the exhaust stroke and the top dead center of the compression stroke in the first cylinder; and
    instructions for determining the opening and closing of the valves of the first cylinder on the basis of the first injection or injections.

* * * * *